(12) United States Patent
Nardelli

(10) Patent No.: US 12,472,948 B2
(45) Date of Patent: Nov. 18, 2025

(54) METHOD FOR OPERATING A VEHICLE, COMPUTER PROGRAM, CONTROL SYSTEM AND VEHICLE

(71) Applicant: VALEO SCHALTER UND SENSOREN GMBH, Bietigheim-Bissingen (DE)

(72) Inventor: Graziano Nardelli, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 0 days.

(21) Appl. No.: 18/289,006

(22) PCT Filed: Dec. 6, 2022

(86) PCT No.: PCT/EP2022/084511
§ 371 (c)(1),
(2) Date: Oct. 31, 2023

(87) PCT Pub. No.: WO2023/104764
PCT Pub. Date: Jun. 15, 2023

(65) Prior Publication Data
US 2024/0217517 A1    Jul. 4, 2024

(30) Foreign Application Priority Data
Dec. 10, 2021   (DE) .................... 10 2021 132 711.3

(51) Int. Cl.
*B60W 30/18*   (2012.01)
*B60W 40/072*   (2012.01)
(Continued)

(52) U.S. Cl.
CPC .... *B60W 30/18145* (2013.01); *B60W 40/072* (2013.01); *B60W 50/0097* (2013.01);
(Continued)

(58) Field of Classification Search
CPC ........ B60W 30/18145; B60W 40/072; B60W 50/0097; B60W 2540/18; B60W 2552/30;
(Continued)

(56) References Cited

U.S. PATENT DOCUMENTS

2004/0153243 A1* 8/2004 Shimazaki ......... B62D 15/0275
  701/1
2012/0101680 A1* 4/2012 Trepagnier .............. G01S 17/86
  701/25
(Continued)

FOREIGN PATENT DOCUMENTS

DE   112017000865 T5   11/2018
DE   102020216470 A1    7/2021
(Continued)

OTHER PUBLICATIONS

Marzbani et al., "Autonomous Vehicles: Autodriver Algorithm and Vehicle Dynamics", Apr. 2019, IEEE Transactions on Vehicular Tecnology, vol. 68, No. 4, pp. 3201-3210 PDF File Name: "Autonomous_Vehicles_Autodriver_Algorithm_and_Vehicle_Dynamics.pdf" (Year: 2019).*
(Continued)

*Primary Examiner* — Hung Q Nguyen
*Assistant Examiner* — Ruben Picon-Feliciano
(74) *Attorney, Agent, or Firm* — Osha Bergman Watanabe & Burton LLP

(57) ABSTRACT

A method for operating a vehicle (1), comprising:
receiving (S1) sensor data (S) of a sensor system (3) of the vehicle (1), the sensor data (S) including a current steering-angle (δ) and steering-angle velocity (W) of the vehicle (1) driving on a road (14) with a curve (13), determining (S2) a radius ahead $R_A$ of the curve (13) at a position ahead (P2) that the vehicle (1) will reach in a
(Continued)

predetermined time span T based on an odometry-based radius ahead $R_O$ by the equation:

$$R_O = R_C - T\left[(L \cdot W)/(\sin^2(\delta))\right],$$

wherein L is a distance between front and rear wheels (17, 18) of the vehicle (1) and $R_C$ is a radius of the road (14) at the current position (P1) of the vehicle (1), and performing (S6) a curvature control function based on the determined radius ahead $R_A$.

13 Claims, 6 Drawing Sheets

(51) Int. Cl.
*B60W 50/00* (2006.01)
*G06V 20/56* (2022.01)

(52) U.S. Cl.
CPC ....... *G06V 20/588* (2022.01); *B60W 2540/18* (2013.01); *B60W 2552/30* (2020.02); *B60W 2552/53* (2020.02); *B60W 2710/205* (2013.01); *B60W 2720/10* (2013.01)

(58) Field of Classification Search
CPC ....... B60W 2552/53; B60W 2710/205; B60W 2720/10; B60W 2710/207; G06V 20/588; B60Y 2300/1815
See application file for complete search history.

(56) References Cited

U.S. PATENT DOCUMENTS

| 2014/0253722 | A1* | 9/2014 | Smyth | G06T 7/10 |
| | | | | 348/135 |
| 2018/0350242 | A1* | 12/2018 | Fujii | B60W 30/18163 |

FOREIGN PATENT DOCUMENTS

| JP | 2015-217707 A | 12/2015 |
| JP | 2017-090339 A | 5/2017 |
| JP | 2018-106589 A | 7/2018 |
| JP | 6738377 B2 | 8/2020 |
| KR | 101504252 B1 | 3/2015 |
| KR | 1020160036922 A | 4/2016 |
| KR | 1020160050441 A | 5/2016 |
| WO | 202001346 A1 | 1/2020 |
| WO | 2021149039 A1 | 7/2021 |

OTHER PUBLICATIONS

Jazar, "Mathematical Theory of Autodriver for Autonomous Vehicles", 2010, Journal of Vibration and Control, 16(2), pp. 254-276 PDF File Name: "Mathematical_Theory_of_Autodriver_for_Autonomous_Vehicles.pdf" (Year: 2010).*
International Search Report and Written Opinion in corresponding International Application No. PCT/EP2022/084511, dated Feb. 9, 2023 (9 pages).
German Search Report in corresponding German Application No. 10 2021 132 711.3, dated Aug. 10, 022 (5 pages).
Office Action in corresponding Korean Application No. 10-2023-7035547, dated Sep. 22, 2025 (11 pages).

* cited by examiner

METHOD FOR OPERATING A VEHICLE, COMPUTER PROGRAM, CONTROL SYSTEM AND VEHICLE

The present invention relates to a method for operating a vehicle, a computer program, a control system and a vehicle with such a control system.

Modern vehicles, such as passenger vehicles, are nowadays usually equipped with several driver assistant systems. Examples are systems for adapted cruise control (ACC), lane keeping assistance (LKA), highway assistance (HWA), traffic jam assistance (TJA) and traffic jam pilot (TJP). A crucial aspect of these systems is a curvature control. This includes an anticipation of a curvature of an approaching curve and a correspondingly adapted velocity. Usually, the curvature of a road is determined based on lane markings detected by a camera of the vehicle. If no lane markings are present on the road or if the quality in the image data representing the lane markings is poor, a current path determined from odometry data is used instead. For example, WO 2020/001346 A1 proposes to acquire current steering wheel angle information of the vehicle if no road surface marker is identified from a road surface image.

It is one object of the present invention to provide an improved method for operating a vehicle.

Accordingly, a method for operating a vehicle is provided. The method comprises the steps:
receiving sensor data of a sensor system of the vehicle, the sensor data including a current steering-angle δ and steering-angle velocity W of the vehicle driving on a road with a curve,
determining a radius ahead $R_A$ of the curve at a position ahead P2 that the vehicle will reach in a predetermined time span T based on an odometry-based radius ahead $R_O$ given by the equation:

$$R_O = R_C - T[(L \cdot W)/(\sin^2(\delta)],$$

wherein δ is the steering-angle, W is the steering-angle velocity, L is a distance between the front and rear wheels of the vehicle and $R_C$ is a radius of the road at the current position of the vehicle, and
performing a curvature control function based on the determined radius ahead $R_A$.

Hence, the radius $R_A$ of a curvature of a curve of the road on which the vehicle is driving, the radius $R_A$ being a radius at a position ahead of the vehicle, is determined based on sensor data of a steering-angle sensor of the vehicle, in particular based on the measured current steering-angle and steering-angle velocity of the vehicle. Thus, the curvature of the road on which the vehicle is driving is determined based on odometry data. This allows a better anticipation of the curvature. Further, the curvature of the road can be determined also in the case that no lane markings are present on the road and/or detected in image data of a camera of the vehicle. A better anticipation of the curvature of the road allows a better curvature control of the vehicle. In particular, a control of advanced braking before and/or during entering a curve can be improved, thus increasing safety and comfort of vehicle passengers.

By determining the radius ahead $R_A$ of the curvature of the curve at the position ahead P2 that the vehicle will reach in the predetermined time span T, driving conditions, an expected state and/or a nominal state of the vehicle can be predicted for a point in time when the predetermined time span T has elapsed. The predetermined time span T can for example be a or any value within the range of 0.5 to 2.5 seconds. In particular, the predetermined time span T can, for example, have a value of or of about 0.5 seconds, 1 second, 1.5 seconds, 2 seconds, or 2.5 seconds.

The steering-angle is, for example, a rotation angle of a steering shaft of the vehicle. The steering-angle is, for example, an angle of one or more driving wheels of the vehicle. The steering-angle velocity is, for example, a first derivative with respect to time of the steering-angle.

The odometry-based radius ahead $R_O$ is, for example, calculated based on the steering-angle δ and the steering-angle velocity W=dδ/dt by the following relations:

$$R_C = L/\tan(\delta),$$

based on trigonometric relation in a right–angled triangle, $$dR_C/dt = L \cdot d/dt[1/\tan(\delta)],$$

$$dR_C/dt = -L \cdot d\delta/dt/[\sin^2(\delta)],$$

$$R_O = R_C + dR_C/dt,$$

and $$R_O = R_C - T[(L \cdot W)/(\sin^2(\delta)],$$

wherein $$W = d\delta/dt.$$

The road on which the vehicle is driving includes, for example, one or more lanes. There can be lane markings limiting the lane(s), thus marked lanes. In another case, for example, no lane markings for the one or more lanes are present, thus unmarked lanes. The vehicle is, for example, driving on one of the (e.g. marked or unmarked) lanes of the road. The curve of the road is, for example, a curve of a (e.g. marked or unmarked) lane on which the vehicle is driving. The radius of a curvature of the road is, for example, a radius of a curvature of the (e.g. marked or unmarked) lane on which the vehicle is driving.

The sensor system includes, in particular, a steering-angle sensor unit. The steering-angle sensor unit is, for example, based on a magnetoresistance technology such as a Giant Magnetoresistance technology (GMR element). The steering-angle sensor is, for example, fixed on a steering shaft of the vehicle. A hub gear wheel of the sensor is, for example, transmitting the rotary movement of the shaft to two measuring gear wheels. In each measuring gear wheel, for example a magnet is mounted, whose field changes its direction in accordance with the rotational movement. Below each magnet, a GMR sensor element may be located to detect the angle position of the magnet above. The analog values of the GMR elements are, for example, converted into digital information. The steering-angle sensor provides, for example, an absolute steering-angle value over the complete steering-angle range.

The sensor system of the vehicle includes, for example, further sensor units such as one or more environmental sensor units. The environmental sensor units are configured to detect a driving state of the vehicle and/or an environment of the vehicle. Examples of such sensor units are a camera device for capturing images of the surrounding, a radar device (radio detection and ranging) for obtaining radar data and a lidar device (light detection and ranging) for obtaining lidar data. The sensor system may in addition include ultrasonic sensors, location sensors, rain sensors, temperature sensors and/or light sensors.

The sensor units of the vehicle are each configured to output a sensor signal, for example to a driving assistance system or a parking assistance system, which for example performs assisted or (semi-)autonomous driving as a function of the detected sensor signals. In particular, the sensor units can each be configured to output a sensor signal to the control system and/or a curvature control system/unit, which performs curvature control as a function of the detected sensor signals.

The method steps are, in particular, carried out by a control system of the vehicle.

According to an embodiment, a nominal velocity $V_A$ of the vehicle at the position ahead is determined based on the determined radius ahead $R_A$ and a predetermined maximum lateral acceleration $A_{MAX}$ by the equation:

$$V_A = (A_{MAX} \cdot R_A)^{1/2}.$$

Furthermore, the curvature control function is performed based on the determined nominal velocity $V_A$.

By calculating the nominal velocity $V_A$ at the position ahead based on the determined radius ahead $R_A$ and a predetermined maximum lateral acceleration $A_{MAX}$, the curvature control of the vehicle can be performed such that the velocity of the vehicle at the position ahead is equal (or below) the calculated nominal velocity. Hence, it can be avoided that the vehicle is pulling and/or braking out of the curve.

The maximum lateral acceleration $A_{MAX}$ has, for example, a or any value between 2.5 m/s² and 3.5 m/s². The maximum lateral acceleration $A_{MAX}$ can have, for example, a value of or of about 2.5 m/s², 3 m/s² or 3.5 m/s², 2 m/s² or smaller, 2.5 m/s² or smaller or 3 m/s² or smaller. The value of the maximum lateral acceleration $A_{MAX}$ depends on the velocity of the vehicle.

According to a further embodiment, an expected acceleration of the vehicle at the position ahead is determined based on a current velocity $V_C$ of the vehicle and a nominal velocity $V_A$ of the vehicle at the position ahead. Further, a presence of lane markings of the road is detected and a track quality of the detected lane markings is determined based on the sensor data, and a lane-based radius ahead $R_L$ of the curve at the position ahead is determined based on the detected lane markings. Furthermore, the curvature control function is performed based on the odometry-based radius ahead $R_O$ and the lane-based radius ahead $R_L$ such that:
  the radius ahead $R_A$ is set equal to the minimum of the lane-based radius ahead $R_L$ and the odometry-based radius ahead $R_O$ when the determined track quality is above a predetermined track quality threshold and the determined expected acceleration corresponds to a braking of the vehicle,
  the radius ahead $R_A$ is set equal to the maximum of the lane-based radius ahead $R_L$ and the odometry-based radius ahead $R_O$ when the determined track quality is above the predetermined track quality threshold and the determined expected acceleration corresponds to a positive acceleration of the vehicle, and
  the radius ahead $R_A$ is set equal to the odometry-based radius ahead $R_O$ when the determined track quality is at or below the predetermined track quality threshold.

Thus, when the track quality of the detected lane markings is too poor (i.e., equal to or below the predetermined track quality threshold), the radius ahead $R_A$ of the curve of the road on which the vehicle is driving can be advantageously determined based on the odometry-based radius ahead $R_O$ alone.

Further, when the track quality of the detected lane markings is within a desired range (i.e., above the predetermined track quality threshold), the radius ahead $R_A$ of the curve of the road on which the vehicle is driving can be advantageously set equal to either the lane-based radius ahead $R_L$ or the odometry-based radius ahead $R_O$ depending on the acceleration state (braking or positive acceleration) of the vehicle.

The current velocity $V_C$ of the vehicle is the velocity of the vehicle at the current position.

The sensor system of the vehicle includes, in particular, one or more camera devices for capturing images of the surrounding of the vehicle. Further, the presence or absence of lane markings of the road is detected based on image data (as an example of sensor data) of the one or more camera devices of the vehicle. The camera device(s) include, for example, a front camera arranged at the front windscreen of the vehicle and configured to monitor an area in front of the vehicle. However, the one or more camera devices may also be arranged at a different window of the vehicle and/or monitor a different area, e.g., at the sides or behind the vehicle.

Determining the track quality of the detected lane markings includes, for example, determining a level of the current track quality of the detected lane markings. The track quality (level) of the detected lane markings corresponds, for example, to an image quality of the image data provided by the one or more camera devices. A level of the track quality of the detected lane markings and/or a level of the image quality of the image data provided by the one or more camera devices is, for example, determined and provided by the one or more camera devices. The predetermined track quality threshold is, for example, a predetermined threshold of the track quality level.

In embodiments, the method includes the step of determining an error $\Delta R_L$ of the determined lane-based radius ahead $R_L$. The error $\Delta R_L$ is, for example, a measure of the track quality of the detected lane markings. Further, in this case, the curvature control function may be performed based on the odometry-based radius ahead $R_O$ and the lane-based radius ahead $R_L$ such that:
  the radius ahead $R_A$ is set equal to the minimum of the lane-based radius ahead $R_L$ and the odometry-based radius ahead $R_O$ when the determined error $\Delta R_L$ is below a predetermined threshold and the determined expected acceleration corresponds to a braking of the vehicle,
  the radius ahead $R_A$ is set equal to the maximum of the lane-based radius ahead $R_L$ and the odometry-based radius ahead $R_O$ when the determined error $\Delta R_L$ is below the predetermined threshold and the determined expected acceleration corresponds to a positive acceleration, and
  the radius ahead $R_A$ is set equal to the odometry-based radius ahead $R_O$ when the determined error $\Delta R_L$ is equal to or above the predetermined threshold.

Thus, when the error $\Delta R_L$ of the determined lane-based radius ahead $R_L$ is too large (i.e., equal to or above the predetermined threshold), the radius ahead $R_A$ of the curve of the road on which the vehicle is driving can be advantageously determined based on the odometry-based radius ahead $R_O$ alone.

Further, when the error $\Delta R_L$ of the determined lane-based radius ahead $R_L$ is within a desired range (i.e., below the predetermined threshold), the radius ahead $R_A$ of the curve of the road on which the vehicle is driving can be advantageously set equal to either the lane-based radius ahead $R_L$ or the odometry-based radius ahead $R_O$ depending on the acceleration state (braking or positive acceleration) of the vehicle.

According to a further embodiment, the lane-based radius ahead $R_L$ is determined by the equation:

$$R_L = 1/[(6 \cdot a \cdot T) + (2 \cdot b)],$$

wherein a and b are the first two coefficients of a polynomial and T is the predetermined time span.

The polynomial is, in particular, a polynomial function. The polynomial is, in particular, mathematically representing a perceived lane. The polynomial is, for example, a third-degree or higher-order polynomial function. For example, the lane-based radius ahead $R_L$ is determined based on the first two coefficients a and b of the third-degree polynomial:

$$P(x) = ax^3 + bx^2 + cx + d.$$

Further, the curvature ahead can be expressed as:

$$C_A = (6 \cdot a \cdot T) + (2 \cdot b).$$

Furthermore, the radius ahead $R_L$ is given by:

$$R_L = 1/C_A.$$

According to a further embodiment, performing the curvature control function includes controlling an acceleration and/or a jerk of the vehicle based on a current velocity $V_C$ of the vehicle at a current position and a nominal velocity $V_A$ of the vehicle at the position ahead.

By controlling the acceleration and/or jerk of the vehicle, in particular a braking process (negative acceleration) of the vehicle with respect to time (timely evolution of braking) from the current velocity $V_C$ to the nominal velocity $V_A$ can be controlled. Hence, a safety and comfort of the passengers can be increased.

The jerk of the vehicle describes, in particular, the variation of the acceleration of the vehicle with time. The jerk of the vehicle is, in particular, the first derivative with respect to time of the acceleration of the vehicle and the second derivative with respect to time of the velocity of the vehicle.

The jerk of the vehicle includes, for example, a longitudinal jerk. In other examples, the jerk of the vehicle may also include, for example, a lateral jerk.

The jerk of the vehicle is, for example, controlled based on a difference of the current velocity $V_C$ of the vehicle and the nominal velocity $V_A$ of the vehicle at the position ahead.

According to a further embodiment, controlling the acceleration and/or the jerk of the vehicle includes a proportional and/or derivative controlling of the acceleration and/or the jerk, and the nominal velocity $V_A$ of the vehicle at the position ahead is a setpoint in the proportional and/or derivative controlling and the current velocity $V_C$ of the vehicle is a process variable of the proportional and/or derivative controlling.

In particular, the jerk is controlled such that the current velocity $V_C$ of the vehicle is driven towards the nominal velocity $V_A$, the nominal velocity $V_A$ being the setpoint of the controller, i.e. the desired value for the velocity of the vehicle at the position ahead.

In particular, the control system includes a proportional controller, a derivative controller and/or a proportional derivative controller. A proportional derivative controller (PD controller) is a combined proportional and derivative controller, i.e. a proportional plus a derivative controller.

A proportional controller is a type of controller in which an output of the controller varies in proportion with an input (e.g., an error signal) of the controller. A derivative controller is a type of controller in which an output of the controller is proportional to a rate with which an error signal is changing with time. The error signal is, for example, the error between a setpoint (here: the nominal velocity $V_A$ of the vehicle at the position ahead) and a measurement of the process variable (here: the current velocity $V_C$ of the vehicle).

According to a further embodiment, performing the curvature control function includes determining a first time phase of negative jerk, a second time phase of zero jerk and a third time phase of positive jerk based on a current velocity $V_C$ of the vehicle at a current position and on a nominal velocity $V_A$ of the vehicle at the position ahead, said first, second and third time phases being continuous with each other.

By determining the time phases of acceleration and jerk, the curvature control function can be better performed.

The first time phase is, for example, a time phase before and/or during the vehicle entering the curve of the road with negative acceleration (braking). The second time phase is, for example, a time phase of driving within the curve with constant acceleration. The third time phase is, for example, a time phase of still negative acceleration but with positive jerk (i.e., still braking but decreasing braking).

The first, second and third time phases (e.g., the start and end time points of each of the first, second and third time phases) are, for example, determined by means of a state machine of the control system.

In embodiments, performing the curvature control function includes determining a fourth time phase of zero jerk and zero acceleration (i.e., constant speed) and/or a fifth time phase of positive jerk and positive acceleration. The fourth and fifth time phases are, in particular, continuous with the first to third time phases such that the fourth time phase is continuous with the third time phase and the fifth time phase is continuous with the fourth time phase (or if no fourth time phase is present, with the third time phase).

According to a further embodiment, performing the curvature control function includes controlling an acceleration of the vehicle to be below a predetermined acceleration threshold and/or controlling a jerk of the vehicle to be below a predetermined jerk threshold.

Thus, the vehicle is controlled such that a maximum jerk (e.g., maximum longitudinal jerk) of the vehicle is limited. Hence, a safety and comfort of the driver (and other passengers) can be increased.

For example, a longitudinal jerk of the vehicle is controlled to be below a predetermined longitudinal jerk threshold.

According to a second aspect, a computer program is provided. The computer program comprises instructions which, when the program is executed by a computer, cause the computer to carry out the above-described method.

A computer program (computer program product), such as a computer program means, may be embodied as a memory card, USB stick, CD-ROM, DVD or as a file which may be downloaded from a server in a network. For example, such a file may be provided by transferring the file comprising the computer program product from a wireless communication network.

According to a third aspect, a control system for a vehicle is provided. The control system is configured to perform the above-described method.

According to a fourth aspect, a vehicle with an above-described control system is provided.

The respective above or below described entities, e.g. the control system, a receiving unit, a first, second, third and fourth determining unit, an arbitration unit, a curvature control unit, a PD-control unit, may be implemented in hardware and/or in software. If said entity is implemented in hardware, it may be embodied as a device, e.g. as a computer or as a processor or as a part of a system, e.g. a computer system. If said entity is implemented in software it may be embodied as a computer program product, as a function, as a routine, as an algorithm, as a program code, part of a program code or as an executable object. Furthermore, each of the entities mentioned above can also be designed as part of a higher-level control system of the vehicle, such as a central electronic control unit (ECU).

The embodiments and features described with reference to the method of the present invention apply, mutatis mutandis, to the computer program, the control system and the vehicle of the present invention.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

Further embodiments, features and advantages of the present invention will become apparent from the subsequent description and dependent claims.

In the following, the invention will be described in detail based on preferred embodiments with reference to the following figures.

In the figures, like reference numerals designate like or functionally equivalent elements, unless otherwise indicated.

Figure 1:
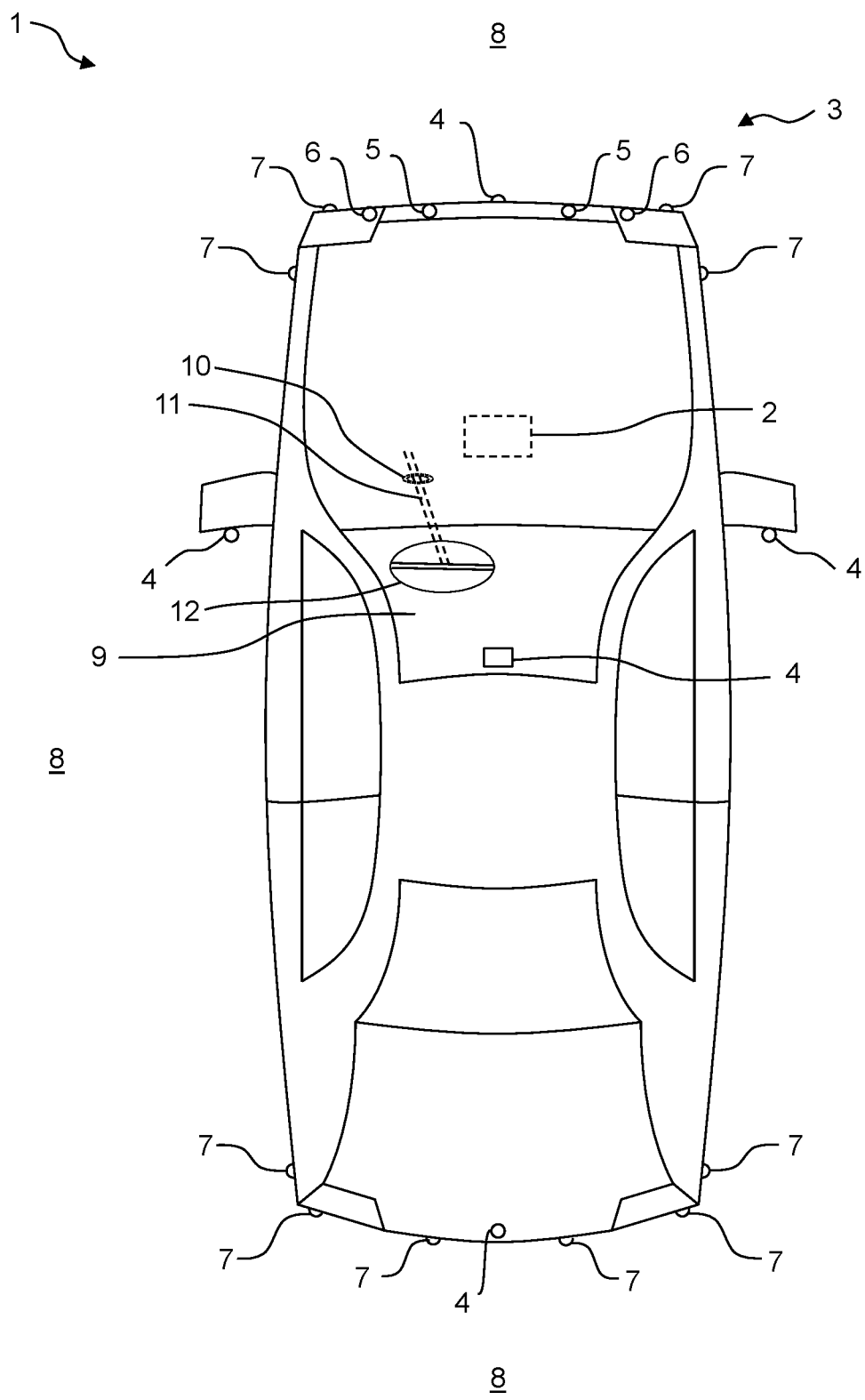
FIG. 1 shows a top view of a vehicle according to an embodiment.

FIG. 1 shows a schematic top view of a vehicle 1. The vehicle 1 is, for example, a passenger vehicle. The vehicle 1 may also be another kind of vehicle such as a van or truck. The vehicle 1 comprises a control system 2 for controlling the vehicle 1.

As shown in FIG. 1, the vehicle 1 comprises a sensor system 3 including several environmental sensor units 4, 5, 6, 7 arranged at the vehicle 1. The sensor system 3 comprise, in particular, one or more camera devices 4 such as one or more front camera devices. The camera devices 4 are configured for obtaining image data I of a surrounding 8 of the vehicle 1 and for sending the image data or results of an image analysis of the image data to the control system 2. The front camera device 4 is attached to a front windscreen 9 of the vehicle 1.

The sensor system 3 further comprise, for example, one or more radar devices 5 for obtaining radar data of the surrounding 8 of the vehicle 1. The sensor system 3 may further comprise, for example, one or more lidar devices 6 for obtaining lidar data of the surrounding 8 of the vehicle 1.

Figure 3:
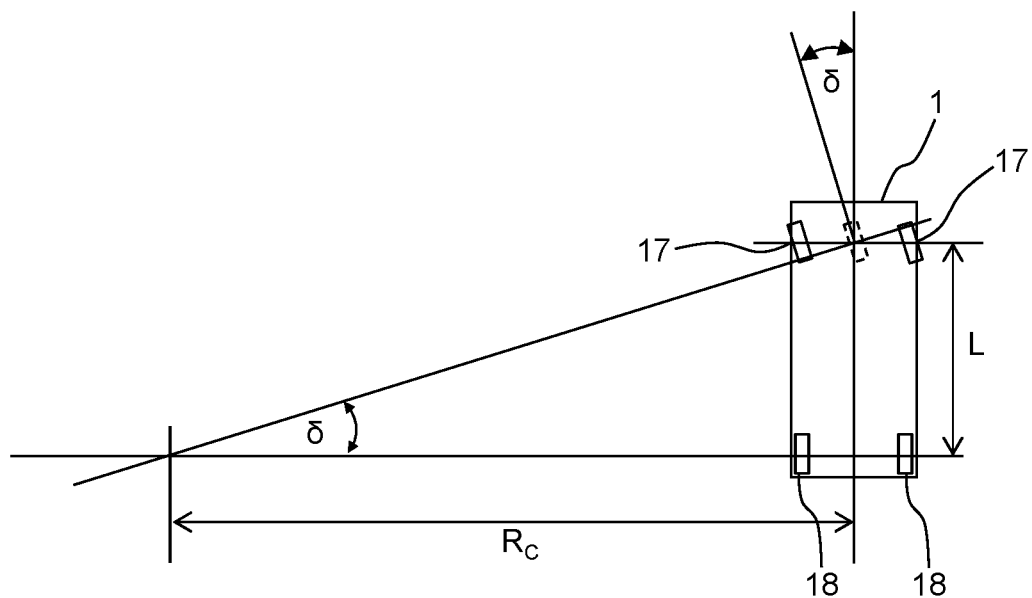
FIG. 3 illustrates a steering-angle of the vehicle of FIG. 1.

The sensor system 3 further comprises a steering-angle sensor 10 arranged at a steering shaft 11 of the vehicle 1. The steering shaft 11 is connected to a steering wheel 12 of the vehicle 1. The steering-angle sensor 10 is configured to measure a steering-angle δ (FIG. 3) and a steering-angle velocity W of the vehicle 1.

The sensor system 3 may comprise further sensors such as ultrasonic sensors 7, one or more rain sensors and/or one or more light sensors (not shown).

In the following, a method for operating the vehicle 1 will be described with reference to FIGS. 2 to 8. The method is, in particular, a method for performing a curvature control of the vehicle 1 to smoothly drive the vehicle 1 into and out of a curve 13 of a road 14 (FIG. 2).

Figure 2:
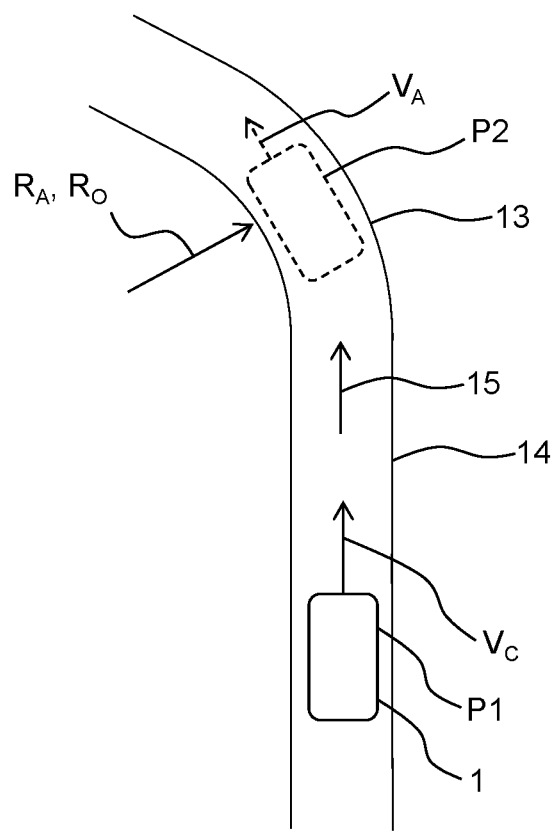
FIG. 2 shows the vehicle of FIG. 1 on a road.

FIG. 2 shows the vehicle 1 of FIG. 1 on the road 14 comprising the curve 13. The vehicle 1 is shown in FIG. 2 on a first position P1 (current position) before entering the curve 13. The vehicle 1 is driving at the current position P1 with a current velocity $V_C$. Furthermore, the vehicle 1 is shown in FIG. 2 with dashed lines on a second position P2, where the vehicle 1 has entered the curve 13. The second position P2 is ahead of the first position P1 with respect to a driving direction 15 of the vehicle 1.

In a first step S1 of the method, the control system 2 of the vehicle 1 receives sensor data S (FIG. 7) of the sensor system 3 (FIG. 1) of the vehicle 1. The sensor data S include odometry data of the steering-angle sensor 10 (FIG. 1), in particular a current steering-angle δ and a current steering-angle velocity W of the vehicle 1. Further, the sensor data S include image data I of the camera device(s) 4 (FIG. 1) of the vehicle 1. The control system 2 comprises, for example, a receiving unit 16 (FIG. 7) for receiving the sensor data S from the sensor system 3.

In a second step S2 of the method, the control system 2 determines a radius ahead $R_O$ of the curve 13 at the position ahead P2 based on the odometry data (δ, w). The position ahead P2 is, in particular, a position that the vehicle 1 will reach in a predetermined time span T (e.g., 1 second or 2 seconds). The control system 2 comprises, for example, a first determining unit 20 (FIG. 7) for determining the odometry-based radius ahead $R_O$. The odometry-based radius ahead $R_O$ is determined based on the following relations.

A current radius $R_C$ (FIG. 3) of the vehicle 1 at the position P1 can be expressed by using the trigonometric function for a right-angled triangle as $$R_C = L/\tan(\delta).$$

Herein, L is a distance between front wheels 17 and rear wheels 18 (FIG. 3) of the vehicle 1.

Further, the first derivative with respect to time of the current radius $R_C$ is then given by $$dR_C/dt = L \cdot d/dt[1/\tan(\delta)]$$
$$dR_C/dt = -L \cdot d\delta/dt/(\sin^2(\delta)).$$

Hence, the odometry-based radius ahead $R_O$ (FIG. 2) of the curve 13 at the position P2 can be written as $$R_O = R_C + dR_C/dt$$
$$R_O = R_C - T[(L \cdot w)/(\sin^2(\delta))],$$

wherein $$W = d\delta/dt.$$

In a third step S3 of the method, the control system 2 determines—in the case that lane markings 19 (FIG. 4) of the road 14' on which the vehicle 1 is driving are detected in the image data I—a lane-based radius ahead $R_L$ of the curve 13' at the position ahead P2. The control system 2 comprises, for example, a second determining unit 21 (FIG. 7) for determining the lane-based radius ahead $R_L$.

Furthermore, a track quality (e.g., a level of a track quality) of the detected lane markings 19 are determined. The track quality (e.g., the track quality level) corresponds, in particular, to an image quality of the image data I received by the camera device(s) 4 and/or a detection quality of the lane markings 19 in the image data I. The track quality (e.g., track quality level) is, for example, determined and/or provided by the camera device(s) 4. Alternatively or in addition, the track quality (e.g., the track quality level) may also be determined by the second determining unit 21 (FIG. 7) of the control system 2.

In a variant, also an error $\Delta R_L$ (FIG. 5) of the lane-based radius ahead $R_L$ may be determined based on the detected lane markings 19. The error $\Delta R_L$ may, in particular, be used as a measure of the track quality (e.g., a measure of the track quality level) of the detected lane markings 19.

The lane-based radius ahead $R_L$ is determined by the equation $$R_L = 1/[(6 \cdot a \cdot T) + (2 \cdot b)].$$

Therein, a and b are the first two coefficients of a third-degree polynomial $(P(x)=ax^3+bx^2+cx+d)$ estimated as a fit (e.g., best-fit) to the curve 13'. Further, T is the predetermined time span of step S2.

In a fourth step S4 of the method, the control system 2 determines a radius ahead $R_A$ to be used in a curvature control function. The radius ahead $R_A$ is determined based on the odometry-based radius ahead $R_O$ determined in step S2 and on the lane-based radius ahead $R_L$ determined in step S3.

In particular, an arbitration (i.e., decision) between the determined odometry-based radius ahead $R_O$ and the determined lane-based radius ahead $R_L$ is performed based on the determined track quality of the detected lane markings 19 (e.g., based on the determined track quality level of the detecting the lane markings 19 and/or based on the determined error $\Delta R_L$ of the lane-based radius ahead $R_L$) and based on an expected acceleration $A_A$ (FIG. 4) of the vehicle 1 at the position ahead P2. The control system 2 comprises, for example, an arbitration unit 22 (FIG. 7) for determining the radius ahead $R_A$ based on the odometry-based radius ahead $R_O$ and on the lane-based radius ahead $R_L$.

When the determined level of the track quality is equal to or below a predetermined track quality threshold, the radius ahead $R_A$ is set equal to the odometry-based radius ahead $R_O$.

When the determined level of the track quality is above the predetermined track quality threshold and the determined expected acceleration corresponds to a braking of the vehicle 1, the radius ahead $R_A$ is set equal to the minimum of the lane-based radius ahead $R_L$ and the odometry-based radius ahead $R_O$.

When the determined level of the track quality is above the predetermined track quality threshold and the determined expected acceleration corresponds to a positive acceleration, the radius ahead $R_A$ is set equal to the maximum of the lane-based radius ahead $R_L$ and the odometry-based radius ahead $R_O$.

Figure 4:
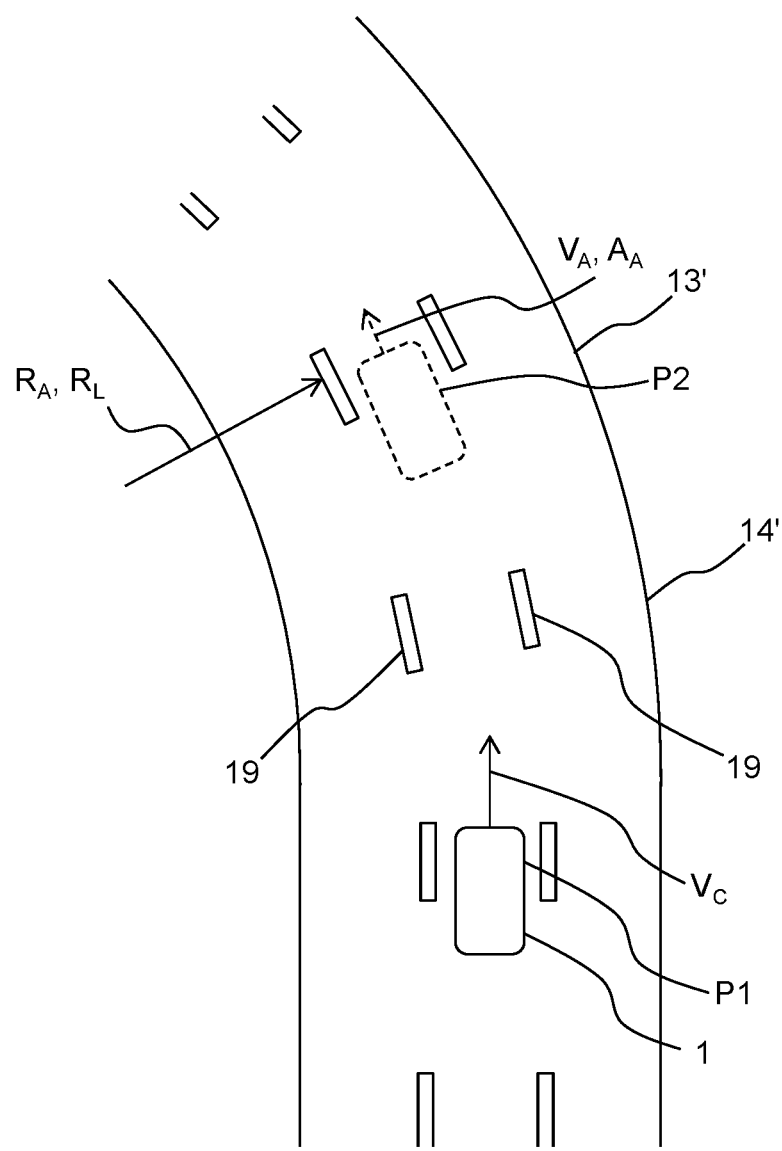
FIG. 4 shows a view similar as FIG. 2, wherein the road comprises lane markings.
Figure 5:
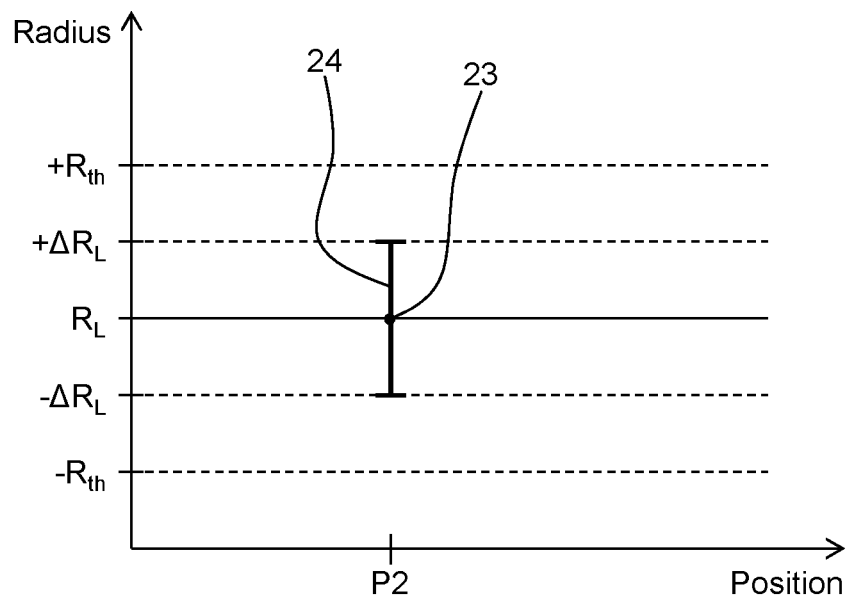
FIG. 5 shows a data point of a determined lane-based radius of a curve of the road of FIG. 4.

In the variant, the track quality may also be estimated based on determining an error $\Delta R_L$ of the lane-based radius ahead $R_L$, as illustrated in FIG. 5. FIG. 5 shows a data point 23 of the determined lane-based radius ahead $R_L$ in a radius-position diagram together with an error bar 24 corresponding to the determined error $\Delta R_L$. Also shown in FIG. 5 is a predetermined threshold Rth for the error $\Delta R_L$ of the lane-based radius ahead $R_L$. In the example shown in FIG. 5, the determined error $\Delta R_L$ is smaller than the predetermined threshold Rth. However, when the lane markings 19 (FIG. 4) are poorly visible and/or the image quality of the image data I is low, the error $\Delta R_L$ can also be larger than the predetermined threshold Rth.

In the example of FIG. 5, when the determined error $\Delta R_L$ is equal to or above the predetermined threshold $R_{th}$, the radius ahead $R_A$ is set equal to the odometry-based radius ahead $R_O$.

Further, in the example of FIG. 5, when the determined error $\Delta R_L$ is below the predetermined threshold $R_{th}$ and the determined expected acceleration corresponds to a braking of the vehicle 1, the radius ahead $R_A$ is set equal to the minimum of the lane-based radius ahead $R_L$ and the odometry-based radius ahead $R_O$.

Furthermore, when the determined error $\Delta R_L$ is below the predetermined threshold $R_{th}$ and the determined expected acceleration corresponds to a positive acceleration, the radius ahead $R_A$ is set equal to the maximum of the lane-based radius ahead $R_L$ and the odometry-based radius ahead $R_O$.

In a fifth step S5 of the method, the control system 2 determines a nominal velocity $V_A$ (FIG. 2) at the position ahead P2 based on the determined radius ahead $R_A$ and a predetermined maximum lateral acceleration $A_{MAX}$ by the equation:

$$V_A = (A_{MAX} \cdot R_A)^{1/2}.$$

The control system 2 comprises, for example, a third determining unit 25 (FIG. 7) for determining the nominal velocity $V_A$.

In a sixth step S6 of the method, the control system 2 performs a curvature control function based on the determined nominal velocity $V_A$ corresponding to the determined radius ahead $R_A$ of the curve 13, 13' at the position ahead P2.

The control system 2 comprises, for example, a curvature control unit 26 (FIG. 7) for performing the curvature control function. In particular, an acceleration A(t) and a jerk J(t) (FIG. 6) of the vehicle 1 are controlled such that the current velocity $V_C$ (FIG. 2) of the vehicle 1 is changed towards the nominal velocity $V_A$ of the vehicle 1 in a suitable manner.

The curvature control unit 26 comprises a proportional derivative control unit 27 (PD-control unit 27). The nominal velocity $V_A$ of the vehicle 1 at the position ahead P2 is a setpoint 28 of the PD-control unit 27. Further, the current velocity $V_C$ of the vehicle 1 is a process variable 29 of the PD-control unit 27. The PD-control unit 27 performs, in particular, a control based on a difference of the current velocity $V_C$ and the nominal velocity $V_A$.

Figure 6:
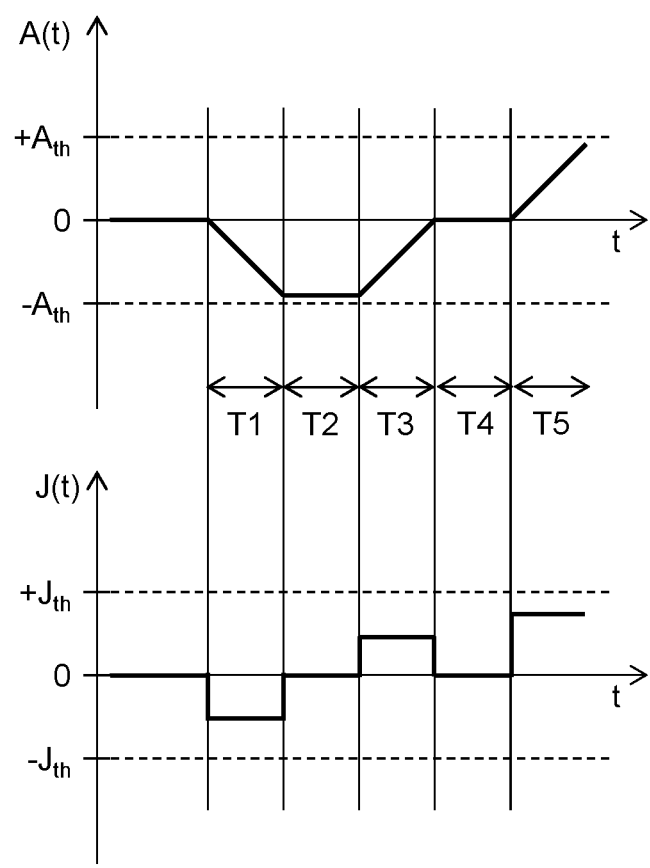
FIG. 6 shows a timely evolution of an acceleration and a jerk of the vehicle of FIG. 1 when driving through a curve of the road shown in FIG. 2 or 4.
Figure 7:
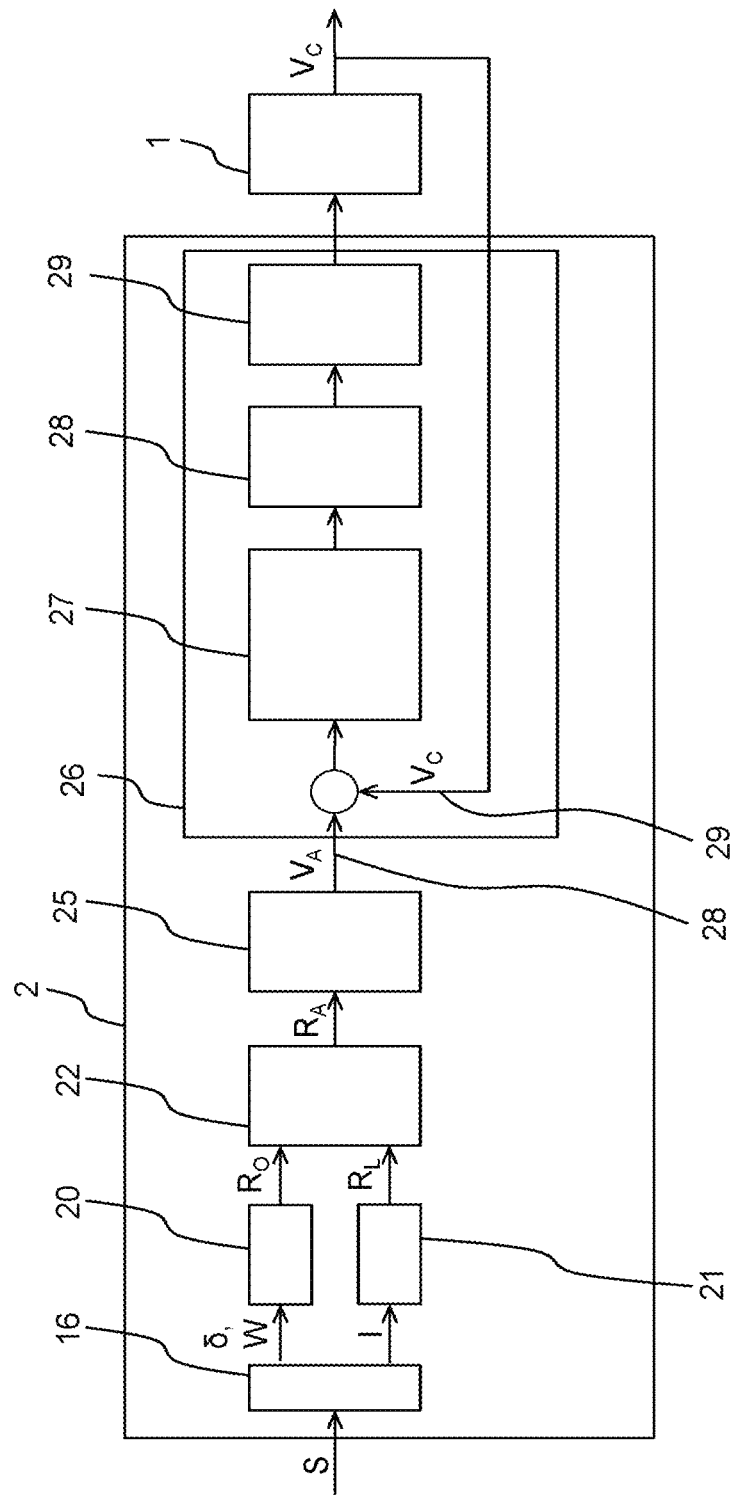
FIG. 7 shows a control system of the vehicle of FIG. 1.
Figure 8:
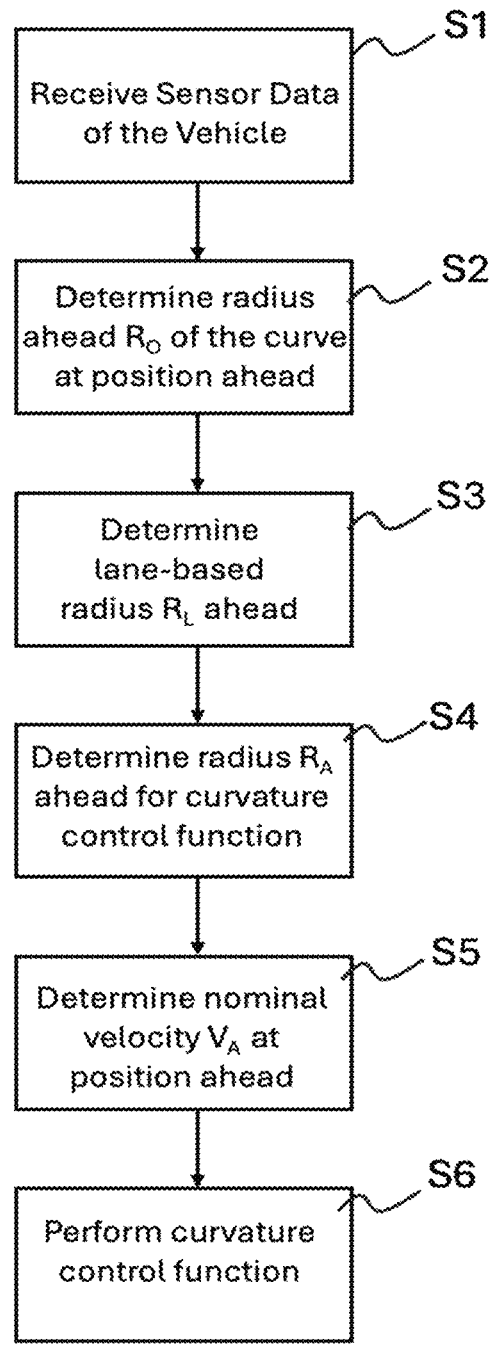
FIG. 8 shows a flowchart illustrating a method for operating the vehicle of FIG. 1.

The curvature control unit 26 further comprises a fourth determining unit 28 for determining time phases T1 T2, T3, T4, T5 of acceleration A(t) and jerk J(t) (FIG. 6). The fourth determining unit 28 includes, for example, a state machine or another logic unit for determining the time phases T1, T2, T3, T4, T5.

FIG. 6 shows in an upper panel a timely evolution of an acceleration A(t) of the vehicle 1 driving through the curve 13 (FIG. 2). Further, in a lower panel of FIG. 6, a timely evolution of a jerk J(t) of the vehicle 1 is shown. The jerk J(t) is the first derivative with respect to time of the acceleration A(t). That means, the jerk indicates a timely variation of the acceleration A(t).

As shown in FIG. 6, a first time phase T1 of negative acceleration (braking) and negative jerk (increasing braking) is determined, the first time phase T1 corresponding, for example, to a state in which and/or before the vehicle 1 enters the curve 13 (FIG. 2). Further, a second time phase T2 of constant negative acceleration (constant braking) and zero jerk is determined, the second time phase T2 corresponding, for example, to a state in which the vehicle 1 is driving within the curve 13. Furthermore, a third time phase T3 of negative acceleration (still braking) but positive jerk (decreasing braking) is determined, third time phase T3 being, for example, a time phase of (preparing) driving, when inside the curve 13, the current velocity $V_C$ is getting close to the nominal velocity $V_A$. In addition, a fourth time phase T4 of zero jerk and zero acceleration (i.e. constant velocity) is determined. The third and fourth time phases T3, T4 may be called "release and constant speed phases". Further, a fifth time phase T5 of positive jerk and positive acceleration is determined. The time phases T1, T2, T3, T4 and T5 are continuous with each other, as shown in FIG. 5.

The curvature control unit 26 further comprises a limitation unit 29 (FIG. 7) for limiting the acceleration A and/or the jerk J (FIG. 6) of the vehicle 1. In particular, the curvature control function is performed such that the acceleration A (i.e. an absolute value of the acceleration A) of the vehicle 1 is below a predetermined acceleration threshold $A_{th}$. Further, the curvature control function is performed such that the jerk J (i.e. an absolute value of the jerk) of the vehicle 1 is below a predetermined jerk threshold $J_{th}$.

Thus, the radius ahead $R_A$ of the curvature of the curve 13 of the road 14 on which the vehicle 1 is driving (FIG. 2) is anticipated based on odometry data (δ, w, FIG. 3) and—if lane markings 19 are detected—based on a curvature of the lane markings 19 (FIG. 4). Based on the radius ahead $R_A$ a nominal velocity $V_A$ as a desired velocity at the position ahead P2 is calculated. Further, a curvature control (FIG. 7) is performed such that in the process of realizing the nominal velocity $V_A$, braking and positive acceleration as well as the jerk are limited (FIG. 6) to values that ensure the safety and comfort of the driver and other passengers of the vehicle 1.

Although the present invention has been described in accordance with preferred embodiments, it is obvious for the person skilled in the art that modifications are possible in all embodiments.

LIST OF REFERENCE SIGNS 1 vehicle
2 control system
3 sensor system
4 sensor unit
5 sensor unit
6 sensor unit
7 sensor unit
8 surrounding
9 windscreen
10 steering-angle sensor
11 steering shaft
12 steering wheel
13, 13' curve
14, 14' road
15 driving direction
16 receiving unit
17 wheel
18 wheel
19 lane markings
20 determining unit
21 determining unit
22 arbitration unit
23 data point
24 error bar
25 determining unit
26 curvature control unit
27 PD-control unit
28 setpoint
29 process variable
δ steering-angle
$\Delta R_L$ error
A acceleration
$A_A$ acceleration
$A_{th}$ acceleration threshold
J jerk
$J_{th}$ jerk threshold
L distance
P1 current position
P2 position ahead
$R_A$ radius
$R_C$ radius
$R_L$ radius
$R_O$ radius
$R_{th}$ radius threshold
S1-S6 method steps
T1 time phase
T2 time phase
T3 time phase
T4 time phase
T5 time phase
$V_A$ velocity
$V_C$ velocity
W steering-angle velocity

The invention claimed is:

1. A method for operating a vehicle, comprising:
receiving sensor data of a sensor system of the vehicle, the sensor data including a current steering-angle δ and steering-angle velocity W of the vehicle driving on a road with a curve;
determining a radius ahead $R_A$ of the curve at a position ahead that the vehicle will reach in a predetermined time span T based on an odometry-based radius ahead $R_O$ given by the equation:

$$R_O = R_C - T[(L \cdot W)/(\sin^2(\delta)],$$

wherein δ is the steering-angle, W is the steering-angle velocity, L is a distance between front and rear wheels of the vehicle and $R_C$ is a radius of the road at the current position of the vehicle; and
performing a curvature control function based on the determined radius ahead $R_A$.

2. The method according to claim 1, wherein
a nominal velocity $V_A$ of the vehicle at the position ahead is determined based on the determined radius ahead $R_A$ and a predetermined maximum lateral acceleration $A_{MAX}$ by the equation:

$$V_A = (A_{MAX} \cdot R_A)^{1/2},$$

and
the curvature control function is performed based on the determined nominal velocity $V_A$.

3. The method according to claim 1, wherein
an expected acceleration of the vehicle at the position ahead is determined based on a current velocity $V_C$ of the vehicle and a nominal velocity $V_A$ of the vehicle at the position ahead,
a presence of lane markings of the road is detected and a track quality of the detected lane markings is determined based on the sensor data,
a lane-based radius ahead $R_L$ of the curve at the position ahead is determined based on the detected lane markings, and
the curvature control function is performed based on the odometry-based radius ahead $R_O$ and the lane-based radius ahead $R_L$ such that the radius ahead $R_A$ is set equal to the minimum of the lane-based radius ahead $R_L$ and the odometry-based radius ahead $R_O$ when the determined track quality is above a predetermined track quality threshold and the determined expected acceleration corresponds to a braking of the vehicle,
the radius ahead $R_A$ is set equal to the maximum of the lane-based radius ahead $R_L$ and the odometry-based radius ahead $R_O$ when the determined track quality is above the predetermined track quality threshold and the determined expected acceleration corresponds to a positive acceleration of the vehicle, and
the radius ahead $R_A$ is set equal to the odometry-based radius ahead $R_O$ when the determined track quality is at or below the predetermined track quality threshold.

4. The method according to claim 3,
wherein the lane-based radius ahead $R_L$ is determined by the equation:

$$R_L = 1/[(6 \cdot a \cdot T) + (2 \cdot b)],$$

wherein a and b are the first two coefficients of a third-degree polynomial and T is the predetermined time span.

5. The method according to claim 1,
wherein performing the curvature control function includes controlling an acceleration and/or a jerk of the vehicle based on a current velocity $V_C$ of the vehicle at a current position and a nominal velocity $V_A$ of the vehicle at the position ahead.

6. The method according to claim 5,
wherein controlling the acceleration and/or the jerk of the vehicle includes a proportional and/or derivative controlling of the acceleration and/or the jerk, and the nominal velocity $V_A$ of the vehicle at the position ahead is a setpoint in the proportional and/or derivative controlling and the current velocity $V_C$ of the vehicle is a process variable of the proportional and/or derivative controlling.

7. The method according to claim 1,
wherein performing the curvature control function includes determining a first time phase of negative jerk, a second time phase of zero jerk and a third time phase of positive jerk based on a current velocity $V_C$ of the vehicle at a current position and on a nominal velocity $V_A$ of the vehicle at the position ahead, said first, second and third time phases being continuous with each other.

8. The method according to claim 1,
wherein performing the curvature control function includes controlling an acceleration of the vehicle to be below a predetermined acceleration threshold and/or controlling a jerk of the vehicle to be below a predetermined jerk threshold.

9. A computer program comprising instructions which, when the program is executed by a computer, cause the computer to carry out the method according to claim 1.

10. A control system for a vehicle which is configured to perform the method according to claim 1.

11. A vehicle comprising a control system according to claim 10.

12. A method for operating a vehicle, comprising:
receiving sensor data of a sensor system of the vehicle, the sensor data including a current steering-angle δ and steering-angle velocity W of the vehicle driving on a road with a curve;
determining a radius ahead $R_A$ of the curve at a position ahead that the vehicle will reach in a predetermined time span T based on an odometry-based radius ahead $R_O$ given by the equation:

$$R_O = R_C - T[(L \cdot W)/(\sin^2(\delta))],$$

wherein δ is the steering-angle, W is the steering-angle velocity, L is a distance between front and rear wheels of the vehicle and $R_C$ is a radius of the road at the current position of the vehicle;

performing a curvature control function based on the determined radius ahead $R_A$; and wherein an expected acceleration of the vehicle at the position ahead is determined based on a current velocity $V_C$ of the vehicle and a nominal velocity $V_A$ of the vehicle at the position ahead, a presence of lane markings of the road is detected and a track quality of the detected lane markings is determined based on the sensor data, a lane-based radius ahead $R_L$ of the curve at the position ahead is determined based on the detected lane markings, and the curvature control function is performed based on the odometry-based radius ahead $R_O$ and the lane-based radius ahead $R_L$ such that the radius ahead $R_A$ is set equal to the minimum of the lane-based radius ahead $R_L$ and the odometry-based radius ahead $R_O$ when the determined track quality is above a predetermined track quality threshold and the determined expected acceleration corresponds to a braking of the vehicle, the radius ahead $R_A$ is set equal to the maximum of the lane-based radius ahead $R_L$ and the odometry-based radius ahead $R_O$ when the determined track quality is above the predetermined track quality threshold and the determined expected acceleration corresponds to a positive acceleration of the vehicle, and the radius ahead $R_A$ is set equal to the odometry-based radius ahead $R_O$ when the determined track quality is at or below the predetermined track quality threshold.

13. A method for operating a vehicle, comprising:

receiving sensor data of a sensor system of the vehicle, the sensor data including a current steering-angle $\delta$ and steering-angle velocity W of the vehicle driving on a road with a curve;

determining a radius ahead $R_A$ of the curve at a position ahead that the vehicle will reach in a predetermined time span T based on an odometry-based radius ahead $R_O$ given by the equation:

$$R_O = R_C - T[(L \cdot W)/(\sin^2(\delta))],$$

wherein $\delta$ is the steering-angle, W is the steering-angle velocity, L is a distance between front and rear wheels of the vehicle and $R_C$ is a radius of the road at the current position of the vehicle; and performing a curvature control function based on the determined radius ahead $R_A$, wherein performing the curvature control function includes determining a first time phase of negative jerk, a second time phase of zero jerk and a third time phase of positive jerk based on a current velocity $V_C$ of the vehicle at a current position and on a nominal velocity $V_A$ of the vehicle at the position ahead, said first, second and third time phases being continuous with each other.

* * * * *